United States Patent
Cannon et al.

(10) Patent No.: US 9,237,215 B2
(45) Date of Patent: Jan. 12, 2016

(54) REMOTE ACTIVATION OF MOBILE APPLICATIONS

(75) Inventors: Matthew John Cannon, Reston, VA (US); Howard Leigh Pfeffer, Reston, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 823 days.

(21) Appl. No.: 13/370,621

(22) Filed: Feb. 10, 2012

(65) Prior Publication Data

US 2013/0210418 A1    Aug. 15, 2013

(51) Int. Cl.
  *H04M 1/725* (2006.01)
  *H04W 4/00* (2009.01)
  *H04L 29/08* (2006.01)
  *G06F 9/44* (2006.01)

(52) U.S. Cl.
  CPC ......... *H04M 1/72522* (2013.01); *G06F 9/4445* (2013.01); *H04L 67/125* (2013.01); *H04W 4/001* (2013.01); *H04L 67/28* (2013.01); *H04M 1/72552* (2013.01)

(58) Field of Classification Search
  CPC ..... H04L 41/0253; H04L 63/08; H04L 67/34; H04L 67/125; H04L 2209/60; H04L 41/5054; H04L 9/3271; G06Q 20/32; H04M 15/43; H04M 15/46; H04M 15/80; H04M 2215/0176; H04M 1/72525; H04W 88/02; H04W 12/08; H04W 4/00; H04W 4/001; G06F 8/60; G06F 2221/2103

USPC .......................................................... 455/466
See application file for complete search history.

(56) References Cited

U.S. PATENT DOCUMENTS

| | | | |
|---|---|---|---|
| 6,453,162 B1 * | 9/2002 | Gentry .......................... 455/433 |
| 6,968,179 B1 * | 11/2005 | De Vries .................... 455/414.1 |
| 6,980,826 B2 * | 12/2005 | Yamaguchi ................ 455/556.1 |
| 7,506,059 B2 * | 3/2009 | Mulligan ....................... 709/230 |
| 8,006,300 B2 * | 8/2011 | Mizrah ........................... 726/20 |
| 2003/0013434 A1 * | 1/2003 | Rosenberg et al. ........... 455/414 |
| 2003/0134615 A1 * | 7/2003 | Takeuchi ....................... 455/411 |
| 2007/0298719 A1 * | 12/2007 | Sproule et al. ............... 455/66.1 |
| 2008/0098464 A1 * | 4/2008 | Mizrah .............................. 726/5 |
| 2008/0126145 A1 * | 5/2008 | Rackley III et al. .............. 705/7 |
| 2009/0253410 A1 * | 10/2009 | Fitzgerald et al. ............ 455/411 |
| 2010/0130169 A1 * | 5/2010 | Narayanaswamy et al. .. 455/411 |
| 2010/0229045 A1 * | 9/2010 | Schultz et al. .................. 714/37 |
| 2011/0265149 A1 * | 10/2011 | Ganesan ........................... 726/4 |

* cited by examiner

*Primary Examiner* — Matthew Sams
(74) *Attorney, Agent, or Firm* — Chapin IP Law, LLC

(57) ABSTRACT

According to one configuration, a user is able to activate an application on a mobile phone device without the user having to directly pressing an appropriate sequence of keys on the mobile phone device. For example, a user logs onto a web site to provide a phone number of the mobile phone device. Additionally, via input to the web site, the user also requests activation of a particular application on the mobile phone device. An application server receives notification of the request and generates a text-message to the application on the mobile phone device to initiate activation of the application. In response to receiving the text-message, the application on the mobile phone device initiates retrieval of appropriate configuration information associated with the user from the application server.

6 Claims, 8 Drawing Sheets

REMOTE ACTIVATION OF MOBILE APPLICATIONS

BACKGROUND

Conventional mobile phone devices now support downloading of applications. In certain cases, a user can download a respective application to the mobile phone device. Prior to execution of the application on the mobile phone device, the respective application may require that the user of the mobile phone device input appropriate information such as a password, user identifier, configuration information, etc. For security reasons, without the appropriate information, the user cannot use the downloaded application. Subsequent to receiving the appropriate information needed to execute and use features of the application, a user can use the application.

BRIEF DESCRIPTION OF EMBODIMENTS

Conventional activation of applications on a communication device can be tedious for a number of reasons. For example, the user must know the appropriate information that must be inputted to the application phone of the mobile phone device. Such information may be difficult for the user to remember or keep track of track over time. Additionally, inputting the information into the mobile phone device may take a substantial amount of time. For example, the user may have to enter long strings of alphanumeric information to activate the downloaded application. Moreover, the keys on the mobile phone device may be small in size, making it difficult for the user to press the correct sequence of buttons to input the information to the newly downloaded application.

Embodiments herein deviate with respect to conventional techniques. For example, one embodiment herein is directed to providing a way to activate an application on a communication device without the user having to directly input the information to the communication device based on pressing an appropriate sequence of keys on the mobile phone device.

As an example, in accordance with one embodiment, a user downloads an application to his communication device such as a mobile phone device. Instead of directly pressing keys of the mobile phone device to provide appropriate configuration information to activate the not-yet-activated application downloaded to the mobile phone device, a user utilizes any suitable resource such as a web browser to input information and initiate activation of the application on the mobile phone device. The application can be downloaded to the mobile phone device in accordance with any suitable downloading method.

In accordance with one embodiment, the user provides a phone number to a server through a web portal. Additionally, the user requests the server to initiate activation of the downloaded application. The server communicates the request to a resource such as an application server that in turn activates the application on the mobile phone device.

The application server receives the phone number and the request to activate the application on the mobile phone device. In one embodiment, the application server produces state information (e.g., a unique sequence of between information, a web cookie, etc.) and associates the state information to the request made by the user to activate the application.

By further way of a non-limiting example, the application server initiates generation of a text-message including the state information. Using the phone number as a target device identifier, the application server initiates transmission of a text-message including the state information to the mobile phone device. The text-message can be transmitted to the mobile phone device over a cellular network that supports text-messaging between users.

The mobile phone device processes the received text-message and, based on target information in the text-message indicating that the text-message is directed to the particular application, a processor (e.g., an operating system) in the mobile phone device forwards the text-message to the yet-to-be activated application on the mobile phone device. At least a portion of the yet-to-be activated application on the mobile phone device may be executing such that the application can receive, process, and respond to the received text-message.

In one embodiment, the application in the mobile phone device processes the text-message and identifies, based on its contents, that the user requests activation of the application via retrieval of configuration information from a remote resource. In this instance, the application initiates communications over a network connection to retrieve the configuration information needed to activate the application on the mobile phone device.

By way of a non-limiting example, in one embodiment, in response to receiving the text-message, the application generates an HTTP request including the state information received from the application server. The application initiates transmission of the HTTP request (and state information) to the application server.

The application server receives the HTTP request from the application on the mobile phone device and maps the state information to appropriate configuration information (e.g., password information, account information, identifier information, etc.) associated with the user requesting the activation through the web browser. The application server then forwards the appropriate configuration information to the application on the mobile phone device. The application on the mobile phone device then uses the received configuration information associated with the user to activate any or all of the features supported by the application.

Accordingly, in contrast to conventional techniques in which a respective user must input the configuration information directly into a mobile phone device, embodiments herein include providing a more convenient method of activating applications on a mobile phone device. A first type of link, such as a link supporting text messaging, supports notification to the application on the mobile phone device that the user would like to activate the application based on the application retrieving configuration information associated with from a remote resource located over a network. The notified application on the mobile phone device communicates over a streaming content type of link (e.g., an internet link, HTTP link, etc.) to retrieve the configuration information in accordance with the user's request.

These and other more specific embodiments are disclosed in more detail below.

Any of the resources (e.g., computer system, mobile phone device, servers, etc.) as discussed herein can include one or more computer processors or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium having instructions stored thereon to facilitate activation, authentication, authorization, etc., of a user and/or an ability to execute a respective downloaded application. The instructions, when executed by a processor of a respective computer device, cause the processor or multiple processors to: from a user operating a browser in a network environment, receive a unique mobile phone identifier value specifying a mobile phone device operated by the user; receive a notification from the user, the notification indicating an application to be activated on the mobile phone device; and generate a request to activate the application on the mobile phone device, the request initiating communications between an application server and the mobile phone device to activate the application of the mobile phone device.

Yet another embodiments herein includes a computer readable storage medium having instructions stored thereon. The instructions, when executed by a processor of a respective computer device, cause the processor or multiple processors to: receive notification of a request transmitted from a user over a web connection to activate an application on a mobile phone device operated by the user, the request including: i) a unique mobile phone identifier value specifying how to contact the mobile phone device operated by the user, and ii) notification of the application to be activated on the mobile phone device; generating a message, the message including an application identifier specifying an identity of the application to be activated on the mobile phone device; and via the unique mobile phone identifier value and the application identifier, transmit the message to the application on the mobile phone device.

Yet another embodiments herein includes a computer readable storage medium having instructions stored thereon. The instructions, when executed by a processor of a respective computer device, cause the processor or multiple processors to: receive a message from an application server, the message directed to a an application to be activated on a mobile phone device operated by a user, the message including state information; forward the message including the state information to the application on the mobile phone device; receive a response generated by the application on the mobile phone device, the response produced by the application being based at least in part on the state information in the message; and transmit the response generated by the application over a network to the application server.

Yet another embodiments herein includes a computer readable storage medium having instructions stored thereon. The instructions, when executed by a processor of a respective computer device, cause the processor or multiple processors to: receive a message from an application server, the message directed to the application on the mobile phone device, the message including state information; generate a response to the message based at least in part on the state information in the received message; and initiate transmission of the response over a network to the application server.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in the field of distributing different levels of quality of content in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, a user is able to activate an application on a communication device without the user having to directly and/or manually press an appropriate sequence of keys on the communication device. For example, a user logs onto a web site to provide an address and/or phone number of the communication device. Additionally, via input to the web site, the user also requests activation of a particular application on the communication device. An application server receives notification of the request and generates a text-message to the application on the mobile phone device to initiate activation of the application. In response to receiving the text-message, the yet-to-be activated application on the mobile phone device initiates retrieval of appropriate configuration information associated with the user from the application server.

Figure 1:
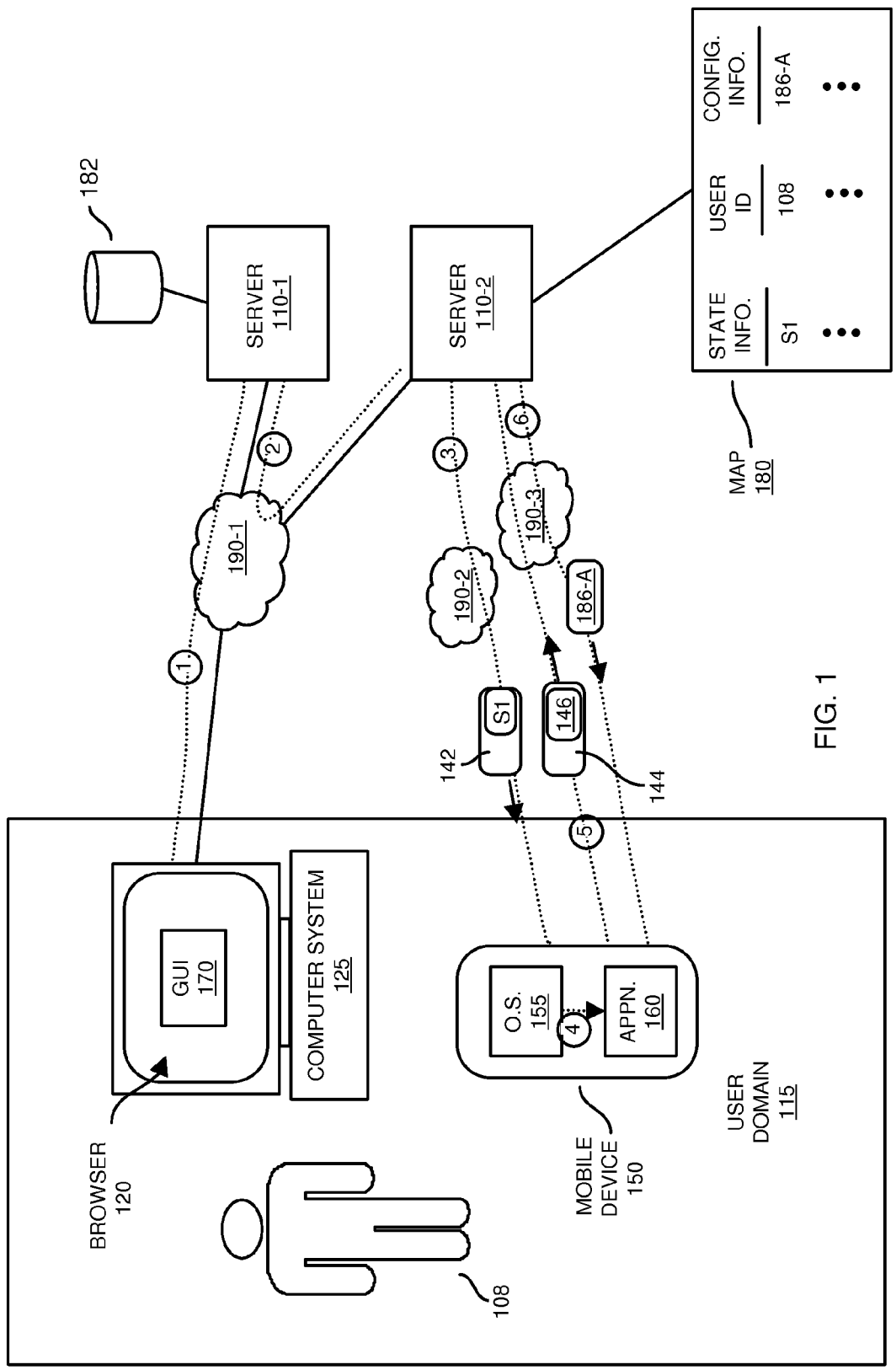
FIG. 1 is an example diagram illustrating a network environment including resources configured to facilitate activation an application on a mobile phone device according to embodiments herein.

FIG. 1 is an example diagram illustrating a network environment facilitating activation of an application on a mobile phone device according to embodiments herein.

As shown, network environment 100 includes a user domain 115 including multiple types of devices operated by the user 108. For example, user domain 115 includes at least computer system 125 and a communication device such as a mobile phone device 150.

In one embodiment, mobile phone device 160 stores one or more applications downloaded from any suitable resource. For example, in one embodiment, the user 108 can operate the mobile phone device 150 and, via input to the mobile phone device, initiate downloading of the application 160 to the mobile phone device. According to another embodiment, the user 108 can provide input to computer system 125 to cause application 160 to be downloaded to the mobile phone device 150. In yet another embodiment, a third party resource can be configured to initiate downloading of the application 160 to the mobile phone device 150. Accordingly, the application 160 can be downloaded to the mobile phone device 150 in any number of suitable ways.

Upon downloading the application 160, the application 160 may need to be initially activated via input of appropriate configuration information such as a password, user identity information, authorization information, etc. Prior to activation, the user 108 may not be able to execute application 160 and use its functionality. Subsequent to providing the appropriate configuration information (e.g., authorization information, authentication information, etc.) the user 1008 is able to execute the application 160 and use its functionality.

As previously discussed, according to one embodiment, the user 108 is able to activate the application 160 on a mobile phone device 150 without the user 108 having to directly press an appropriate sequence of keys on the mobile phone device 150 to enter configuration information directly to the application.

For example, in one embodiment, the user 108 logs onto a web site (e.g., web page served by server 110-1) using browser 120 executing on computer system 125.

Note that use of the browser 120 is shown by way of non-limiting example only and that the user 108 can input information (e.g., a unique mobile phone identifier value, application information, etc.) using any of a number of different types of suitable communication techniques.

In general, via input to the web page (served by the server 110-1 and displayed on the display screen of computer system 120), the user 108 is able initiate activation of the mobile phone device 150. Note that use of computer system 12 is shown by way of non-limiting example only and that the web page, graphical user interface 170, and/or browser 120 displayed on computer system 125 can alternatively be displayed on the mobile phone device 150. Via communications (in step 1), the mobile phone device can be configured to initiate activation of application 160. In other words, in one embodiment, the mobile phone device 150 can be configured to generate the request to server 110-1 or other suitable resource to initiate activation of the application 160.

Figure 2:
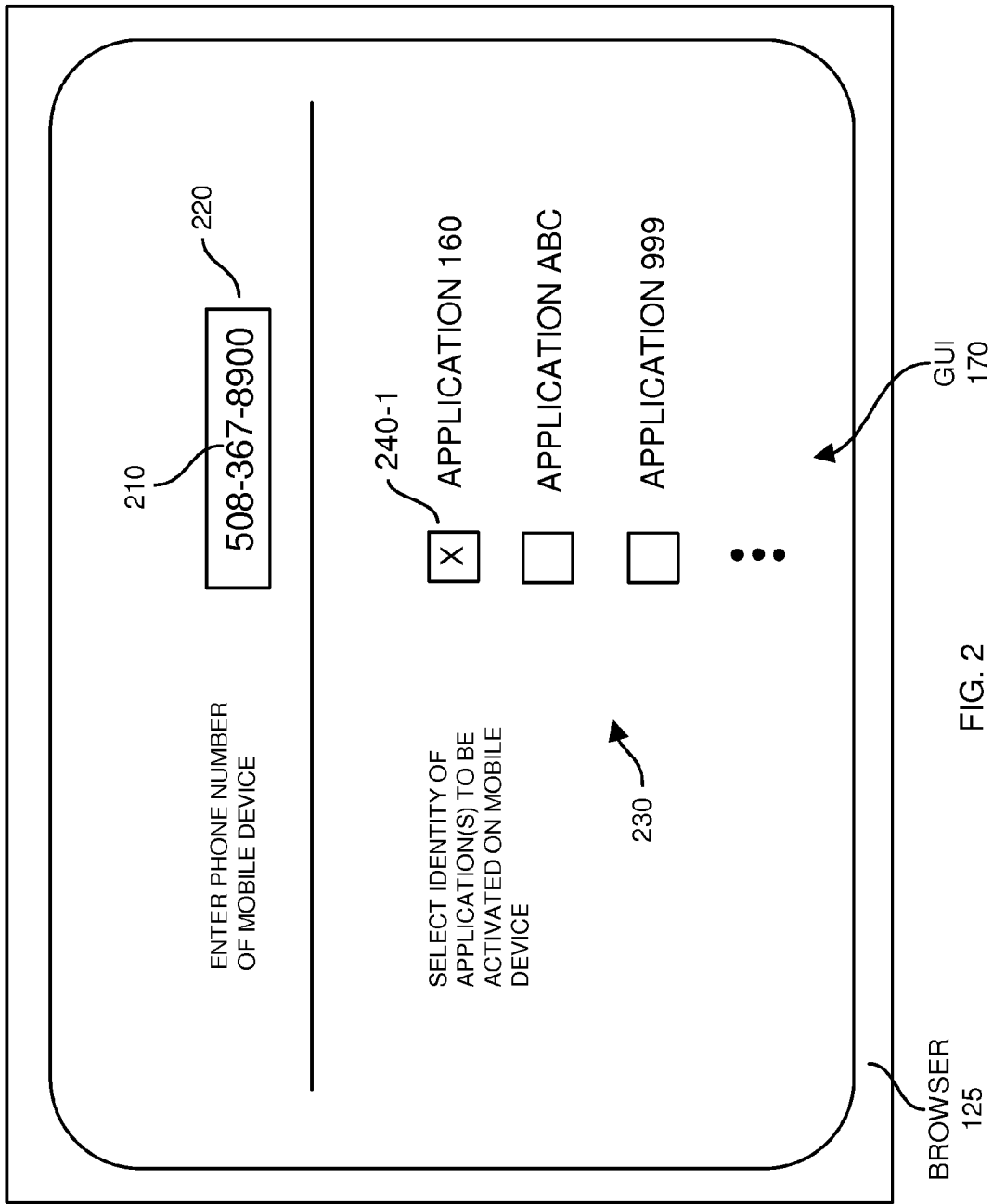
FIG. 2 is an example diagram illustrating a graphical user interface facilitating activation of an application on a communication device according to embodiments herein.

An example of the web page displayed on the browser 120 is shown in FIG. 2. In one embodiment, the server 110-1 initiates distribution of the web page to the user 108 in response to the user requesting to visit a respective website. Access to the web page and/or the user information retrievable and/or viewable by the web page can be restricted. For example, the user 108 may need to provide an appropriate password, authorization information, identifier, etc., to access the web page.

In certain cases, the web page can be configured to enable the user 108 to initiate downloading of the application 160 onto the mobile phone device 160.

In accordance with further embodiments, the retrieved web page includes a graphical user interface 170 to be displayed on the browser 120 operated by the user 108. By way of a non-limiting example, the graphical user interface 170 can be configured to include a data field 220 to enable the user 108 to enter information such as a unique mobile phone identifier value 210. Additional input fields enable the user 108 to select the one or more applications on the mobile phone device 150 that are to be activated.

More specifically, the displayed web page can include a graphical user interface 170 in which to input information to the server 110-1. Graphical user interface 170 can include a data field 220 in which the user 108 inputs contact information indicating how to contact and communicate with the mobile phone device 150. In one embodiment, the contact information inputted by the user 108 is a unique mobile phone identifier value 210 such as a phone number of the mobile phone device 150.

As mentioned above, in addition to specifying a phone number of the mobile phone device 150, the graphical user interface 170 displayed on browser 120 enables the user to provide notification of which of multiple possible applications 230 a user would like to activate on the mobile phone device 150. Thus, one embodiment herein can include initiating distribution, from the server 110-1, of a web page including a graphical user interface 170 to be displayed on the browser 120 operated by the user 108. The graphical user interface 170 displays multiple possible applications 230 that can be activated on the mobile phone device 150. Via input such as selection of or identification of an application 160 from the user 108 through the browser 120, the server 110-1 receives a notification of which of the multiple possible applications 230 that is to be activated on the mobile phone device 150.

In this example, assume that the user 108 selects box 240-1 to indicate that the user 108 would like to activate application 160 on the mobile phone device 150. Note that the example of graphical user interface 170 is shown by way of non-limiting example only and that graphical user interface 170 can support any suitable function in which the user 108 communicates the information over network 190-1 to the server 110-1.

Referring again to FIG. 1, in accordance with the functionality as discussed above, from the user 108 operating the browser 120, the server 110-1 (in step 1) receives a unique mobile phone identifier value (e.g., phone number, e-mail address, etc.) specifying the mobile phone device 150 operated by the user 108. Additionally, via further input by the user 108 through the browser 125 to the server 110-1, the server 110-1 receives a notification indicating an identity of application 160 that is to be activated on the mobile phone device 150.

In one embodiment, subsequent to receiving information such as an identity of the user 108, unique mobile phone identifier value 210, and the identity of the application to be activated on the mobile phone device 160 (as indicated by the x in box 240-1), the server 110-1 generates a request to activate the application 160 on the mobile phone device 150. In one embodiment, the server 110-1 forwards the request (in step 2) or povs notification of the request and appropriate information to server 110-2 (e.g., an application server). As discussed below, providing notification of the request in step 2 initiates further communications (e.g., as discussed in steps 3, 4, 5, and 6) between the application server 110-2 and the mobile phone device 150 to activate the application 160 on the mobile phone device 150.

Note that server 110-1 can be configured to have access to stored personal information associated with the user 108. In one embodiment, the user 108 is able to mange his/her personal information via one or more web pages. Server 110-1 stores personal information in repository 182.

Based on input from the user 108 and use of browser 120, the server 110-1 receives an identity of the user 108. Based on the identity of the user 108, the server 110-1 initiates retrieval of stored personal information associated with the user 108. The personal information can include configuration information, authentication information, authorization information, account information, etc., that is needed or that is relevant for activating a respective application downloaded to the mobile phone device 150.

As discussed below, the generation and transmission of the request and/or notification (to activate the application 160) from the server 110-1 to the server 110-2 initiates a multiple-step process of transferring configuration information from the server 110-2 to the application 160 in the mobile phone device 150 to activate the application 160.

As mentioned, via communications from server 110-1, the server 110-2 receives notification of the request from the user 108 over a web connection (e.g., network 190-1) to activate the application 160 on the mobile phone device 150 operated by the user 108. By way of a non-limiting example, the request can include: i) a unique mobile phone identifier value 220 specifying how to contact the mobile phone device 150 operated by the user 108, and ii) notification of an identity of the application 160 to be activated on the mobile phone device 150.

In response to receiving the notification of the request, the server 110-2 generates message 142. The message 142 can be configured to include an application identifier specifying an identity of the application 160 to be activated on the mobile phone device 150. Via the unique mobile phone identifier value 210 and the application identifier, the server 110-2 transmits the message 142 over network 190-2 to the application 160 on the mobile phone device 150. In one embodiment, the server 110-2 notifies an appropriate resource in the network environment 100 to produce and forward a text-message to the mobile phone device 150 to notify the application 160 of the user's request.

As previously discussed, the server 110-1 and server 110-2 can be configured to communicate with each other. For example, the server 110-1 can transmit any stored personal information or configuration information associated with the user 108 to the server 110-2. The configuration information associated with the user 108 may be received from any suitable source such as from the repository 182, from the user 108 through the browser 120, etc.

As further discussed below, the server 110-2 can use the configuration information associated with the user 108 to initiate activation of the application 160.

By further way of a non-limiting example, the server 110-2 can be configured to transmit the message 142 to the application on the mobile phone device 150 in accordance with a mobile phone text message protocol over network 190-2. Thus, message 142 can be an ATP (Auto-to-person) type text-message. In other words, a machine as opposed to a person generates the text-message that is transmitted to the application 160 on the mobile phone device 160.

Any suitable text message protocol can be used such as SMS (Short Message Service) to transmit the message 142.

In accordance with further embodiments, the server 110-2 (or other suitable resource) generates data such as state information 182 (e.g., any sequence of bit information) to facilitate the activation of the application 160 on the mobile phone device 150. For example, in one embodiment, the server 110-2 produces a map 180. The map 180 associates the state information (e.g., S1) with the user 108. The server 110-2 generates the message 142 to include the state information S1.

By way of a non-limiting example, the state information S1 can be a web cookie or HTTP cookie included in the message 142.

Subsequent to transmitting the message 142 (including state information S1) to the application 160 on the mobile phone device 150, the server 110-2 receives a response 144 from the application 160. In one embodiment, the response 144 includes reply data 146 derived by the application 160. The reply data 146 included in the response 144 can be generated by the application 160 based at least in part on the state information S1 received in the message 142. The reply data can be the state information S1 or a derivative of the state information S1.

Subsequent to receiving the response 144, the server 110-2 validates the response 144 and/or reply data 146 received from the application 160 in the mobile phone device 150. Validating the reply data 146 and/or response 144 received from the mobile phone device 150 can include verifying that the reply data 146 was received from the application on the mobile phone device 150 within a predetermined window of time. As an example, the application 160 may be required to generate the response 144 within a predetermined time frame of sending message 142 or the attempt to activate the application 160 may be aborted.

Via the map 180, the server 110-2 can be configured to map the response 144 to the appropriate configuration information 186-A associated with the user 108. Mapping can include using contents of the response 144 to identify which configuration information to subsequently forward to the application 160.

In accordance with further embodiments, the server 110-2 can use the reply data 146 and/or response 144 as well as the map 180 to identify which configuration information to forward to the application 160. For example, the server 110-2 can be configured to map the reply data 146 (e.g., state information S1 or derivative of state information S1) in the response 144 to configuration information 186-A associated with the user 108.

As mentioned, the reply data 146 received from the application 160 in the mobile phone device 150 can include the state information S1 transmitted in the message 142. In accordance with one embodiment, the server 110-2 uses state information S1 to identify that configuration information 186-A should be sent to the application 160. The state information S1 also can provide an indication to the server 110-2 that the application 160 received message 142 and that the application 160 attempting to retrieve appropriate configuration information associated with the user 108 to activate the application.

By way of a non-limiting example, note that the state information S1 can be a web cookie; the reply data 146 can be the same web cookie.

In accordance with another embodiment, again, as an alternative to the state information S1 being a web cookie, the state information S1 included in the message 142 can be a unique binary value produced by the server or other suitable resource. The application 160 can be configured to apply a known function to the binary value to convert the state information S1 into another unique value. The application 160 can be configured to send the converted value in the response 144 as reply data 146 to the server 110-2. The server 110-2 can be configured to know the function used by the application 160 and what reply data 146 should be returned by the application 160 in the response 144. Validation can include verifying that the value produced by the application 160 is correct before sending the appropriate configuration information 186-A to the application 160.

Subsequent to validating the response 144 and determining that the response 144 includes appropriate reply data 144, the server 110-2 initiates transmission of the configuration information 186-A to the application in the mobile phone device 150 to activate the application 160.

By further way of a non-limiting example, the response 144 generated by the application 160 can be and/or include an HTTP get request message generated by the application 160 on the mobile phone device 150. In other words, the message 142 such as a text-message sent to the application 160 on the mobile phone device 150 can prompt the application 160 to generate and transmit an HTTP get request in order to retrieve the configuration information 186-A from the server 110-2 (e.g., an application server). In one embodiment, the response 144 such as an HTTP request generated by the application 160 can include the state information S1. The application can be configured with an appropriate network address such as a URL (Uniform Resource Locator) to use in order to retrieve the configuration information 186-A from server 110-2. As an alternative, the server 110-2 can send appropriate address information of the application 160 in the message 142.

In accordance with the embodiments as discussed above, and from the perspective of the operating system 155 (in the mobile phone device 150) or mobile phone device 150, the mobile phone device 150 receives the message 142 from the server 110-2. In step 4, the operating system 155 forwards the message 142 to the application 160.

Recall that the message 142 is directed to the application 160 to be activated. Recall also that the message 142 can include state information S1 associated with the user 108. The operating system 155 can be configured to be aware that the application 160 has been downloaded to the mobile phone device. Even though the application 160 may not yet be activated, the operating system 155 can be configured to receive and forward text messages to the application 160.

In accordance with further embodiments, the application 160, though not yet activated, the application 160 is configured to receive messages forwarded by the operating system 155. Further, though not yet activated, the application 160 can be configured to set up a web-type connection to communicate with remote resources and retrieve data. For example, in one embodiment, the application 160 can be configured to set up a network link and retrieve information from one or more remote resources in the network environment 100 as discussed above to retrieve appropriate configuration information to activate the application 160.

In further example embodiments, the operating system 155 receives the message 142 and forwards the message 142 including the state information S1 to the application 160. The application 160 on the mobile phone device 150 generates the response 144 and transmits the response 144 over network 190-3 to the server 110-2. Subsequent to transmitting the response 144 to the server 110-2, the mobile phone device 150 and/or operating system 155 receives the configuration information 186-A associated with the user 108 from the server 110-2. The mobile phone device 150 and/or hardware/software (e.g., operating system 155, inputs, etc.) in the mobile phone device 150 forwards the configuration information 186-A to the application 160.

As previously discussed, in one embodiment, the response 144 generated by the application 160 is an HTTP request to retrieve the configuration information 186-A associated with the user 108 from the server 110-2. Forwarding of the configuration information 186-A from hardware/software in the mobile phone device 150 to the application 160 can include: at the mobile phone device 150, receiving the response (e.g., communication including configuration information 186-A) to the HTTP request from the server 110-2 and forwarding the response (e.g., configuration information 186-A) to the HTTP request received from the server 110-2 to the application 160 on the mobile phone device 150.

Thus, in accordance with one embodiment, the application 160 in the mobile phone device 160 is configured to: receive a message 142 from the server 110-2, the directed to the application 160 on the mobile phone device 150, the message 160 including state information S1; generate a response 144 to the message 142 based at least in part on the state information S1 in the received message 142; and initiate transmission of the response 144 over network 190-3 to the server 110-2. As previously discussed, subsequent to receiving the configuration information 186-A associated with the user 108, the application 160 utilizes the configuration information 186-A to activate the application 160 on the mobile phone device 150.

Again, note that use of the mobile phone device 150 is used by way of a non-limiting example only and that a device operated by the user 108 can be any suitable type of device such as cellular phone device, mobile device, personal digital assistant, touch pad device, portable computer, wire-line telephone, cable set-top box, television, display screen, wireless phone, wireless mobile device, etc.

Note further that networks 190-1, 190-2, 190-3, etc., can be and/or include any suitable type of network supporting communications amongst communication devices 120 and or other resources in communication system 100. For example, network 190 can be and/or include a phone network, cellular phone network, Internet, local area network, public switched telephone network, etc. Communications can include data packets that are packet-switched in accordance with one or more different network routing protocols. Communications in the networks also can include dedicated links on which to transmit the data. However, in one embodiment, the network 190-1 and network 190-3 support web-based communications; the network 190-2 supports mobile phone and/or cellular communications.

Figure 3:
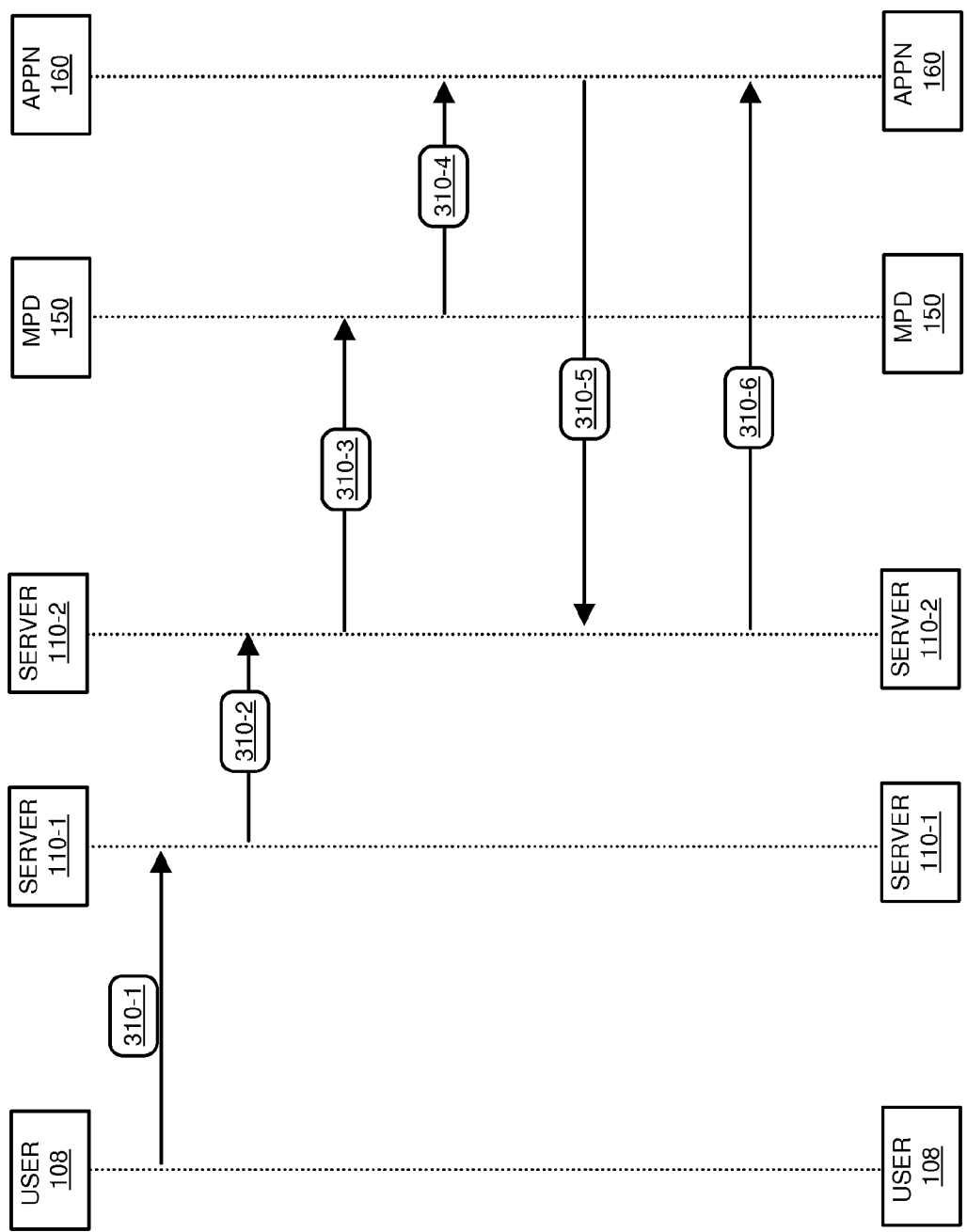
FIG. 3 is an example diagram illustrating a technique of activating a communication device according to embodiments herein.

FIG. 3 is an example diagram illustrating activation of an application on a remotely located communication device according to embodiments herein.

As shown, via communication 310-1, the user 108 can associate a phone number with his account. The server 110-1 receives and stores the phone number information.

Via communications 310-2, the server 110-1 sends a notification to the server 110-2 to send a text message to the mobile phone device 150.

Via communications 310-3, the server 110-2 sends a text message including state information such as a web cookie to the mobile phone device 150.

Via communications 310-4, the mobile phone device 150 forwards the text-message including the web cookie to the application 160.

Via communications 310-5, the application 160 fetches configuration information 186-A to activate the application 160. Fetching can include transmitting the state information S1 (or data derived from the state information S1) back to the server 110-2.

Via communications 310-6, the server 110-2 transmits appropriate configuration information 186-A associated with the user 108 to the application 160 in the mobile phone device 150. The application 160 uses the configuration information 186-A to activate features in the application 160.

By further way of a non-limiting example, assume that the application 160, subsequent to being activated with configuration information A, monitors occurrence of incoming phone calls to the user (e.g., a subscriber). In response to detecting an incoming phone call, the application 160 notifies a remote server of the occurrence of the incoming call. The remote server can be in communication with a cable service that streams content to a playback device operated by the user 108. In such an embodiment, the remote server receives the notification of the incoming call as indicated by the application 160. The remote server then initiates modification of the content to be displayed on the user's display screen. For example, the remote server can be configured to initiate display of the details (e.g., caller identifier number, name, etc.) associated with the call to the mobile phone device 150 on the display screen that is playing back streaming content. Accordingly, in such an embodiment, a user 108 can watch a television program and be notified, via a pop-up notification on the television display screen, that a particular call is being made to the users mobile phone device 150. The remote server modifies playback of the content on the playback device in response to receiving the notification of the inkling call to the users mobile phone device 150. Based on the caller identifier of the caller as displayed in a section of the display screen, the user may or may not decide to answer the call to the mobile phone device 150.

Figure 4:
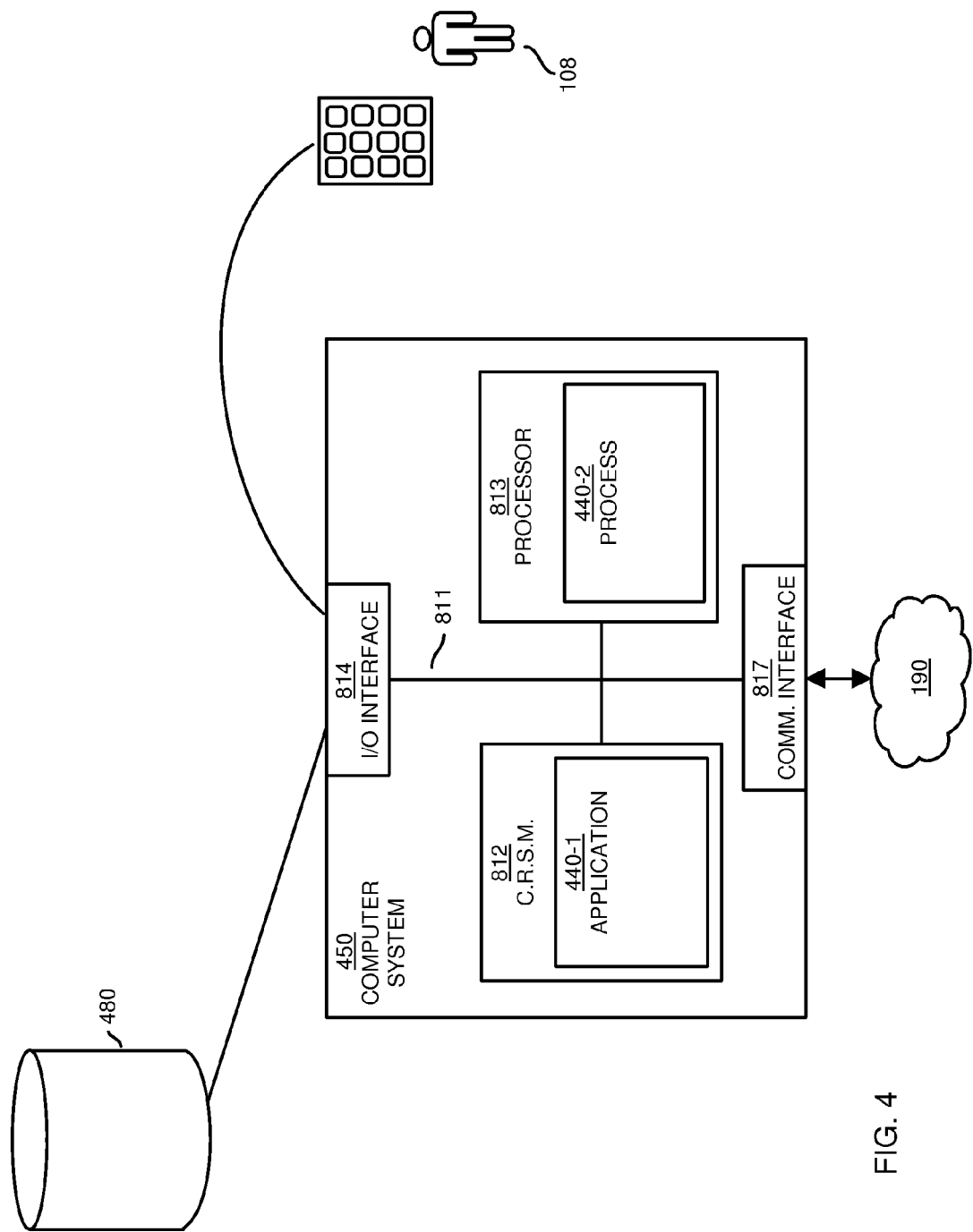
FIG. 4 is a diagram illustrating an example hardware architecture including a processor and an encoded hardware storage medium according to embodiments herein.

FIG. 4 is an example block diagram of a computer system 450 for implementing any of the operations according to embodiments herein.

Example computer system 450 (or similar architecture) can reside in any of the resources as discussed herein such as computer system 125, server 110-1, server 110-2, mobile phone device 150, etc.

As shown, computer system 450 of the present example can include an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface 814 provides connectivity to a repository 480 and, if present, other devices such as a keypad, display screen, a computer mouse, etc.

Computer readable storage medium 812 can be any hardware storage device such as memory, optical storage, hard drive, floppy disk, etc. In one embodiment, the computer readable storage medium 812 stores instructions and/or data. Memory includes any storage hardware capable of storing data.

Communications interface 817 enables the computer system 450 and processor 813 to communicate over a resource such as network 190 to retrieve information from remote sources and communicate with other computers. I/O interface 814 enables processor 813 to retrieve or attempt retrieval of stored information from repository 480.

As shown, computer readable storage media 812 is encoded with application 440-1 (e.g., software, firmware, etc.) executed by processor 813. Application 440-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in application 140-1 stored on computer readable storage medium 812.

Execution of the application 440-1 produces processing functionality such as process 440-2 in processor 813. In other words, the process 440-2 associated with processor 813 represents one or more aspects of executing application 440-1 within or upon the processor 813 in the computer system 450.

Those skilled in the art will understand that the computer system 450 can include other processes and/or software and hardware components, such as an operating system that controls allocation and use of hardware resources to execute application 440-1.

In accordance with different embodiments, note that computer system may be any of various types of devices, including, but not limited to, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 may reside at any location or can be included in any suitable resource in network environment 100 to implement functionality as discussed herein.

Functionality supported by the different resources will now be discussed via flowcharts in FIGS. 5-8. Note that the steps in the flowcharts below can be executed in any suitable order.

Figure 5:
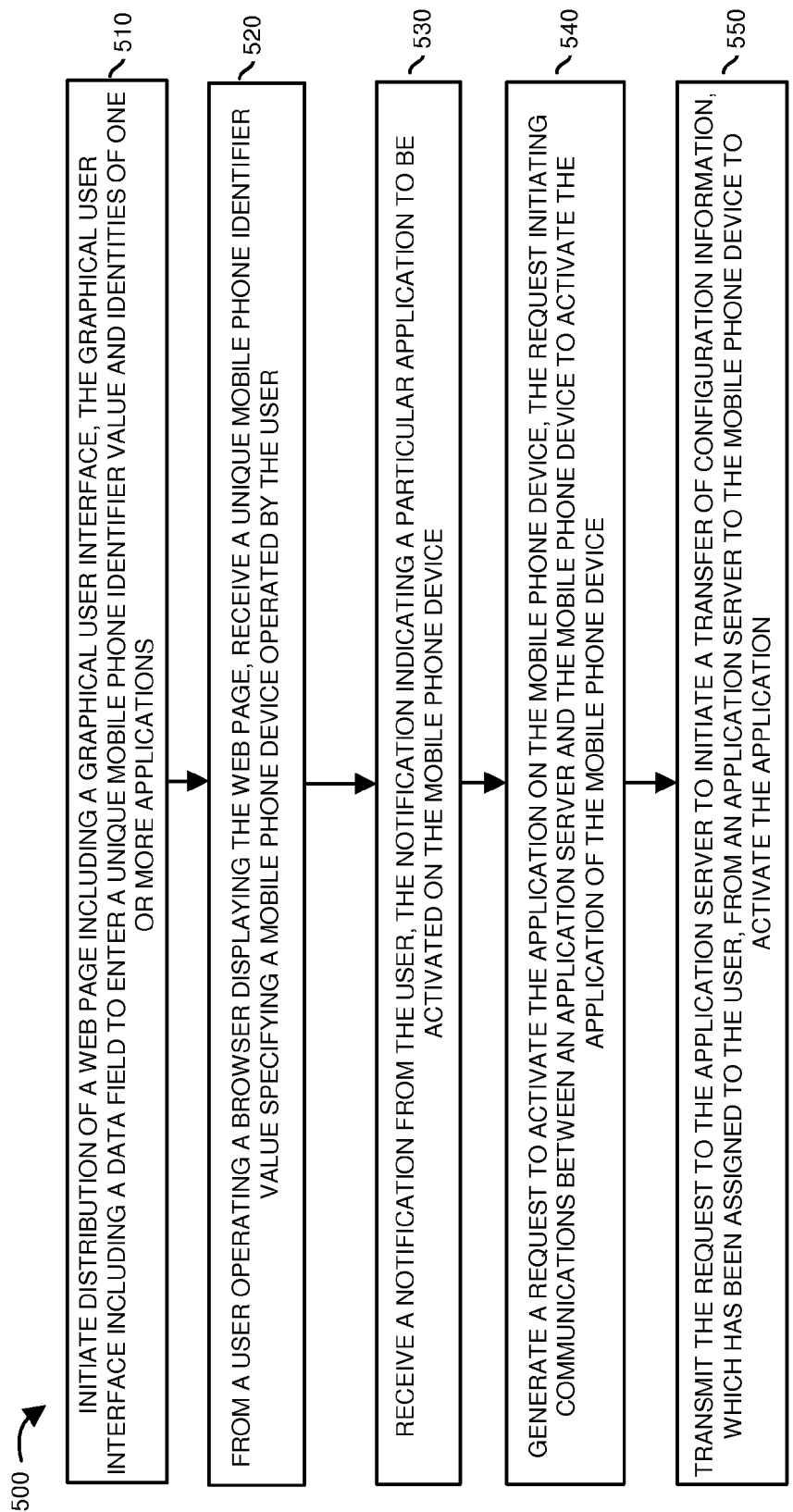
FIGS. 5-8 are flowcharts illustrating example methods according to embodiments herein.

FIG. 5 is a flowchart 500 illustrating an example method implemented in a server and/or related resources according to embodiments herein. Note that there will be some overlap with respect to concepts as discussed above.

In step 510, the server 110-1 initiates distribution of a web page including a graphical user interface 170. By way of a non-limiting example, the graphical user interface 170 can include a data field 220 to enter a unique mobile phone identifier value 210. The graphical user interface 170 can be configured to display identities of one or more applications 230 that can be selected for activation.

In step 520, from a user operating a browser 120 displaying the web page, the server 110-1 receives a unique mobile phone identifier value 210 specifying a mobile phone device 150 operated by the user 108.

In step 530, the server 110-1 receives a notification from the user 108 through the browser 120; the notification indicates a particular application 160 to be activated on the mobile phone device 150.

In step 540, the server 110-1 generates a request to initiate activation of the application 160 on the mobile phone device 150. In one embodiment, the request indicates, to the server 110-2, to initiate communications between a server 110-2 (e.g., an application server 110-2) and the mobile phone device 150 to activate the application 160 of the mobile phone device 150.

In step 550, the server 110-1 transmits the request and/or notification of the request to the application server 110-2 to initiate or trigger a transfer of configuration information, which has been assigned to the user, from the application server 110-2 to the mobile phone device 150 to activate the application 160.

Figure 6:
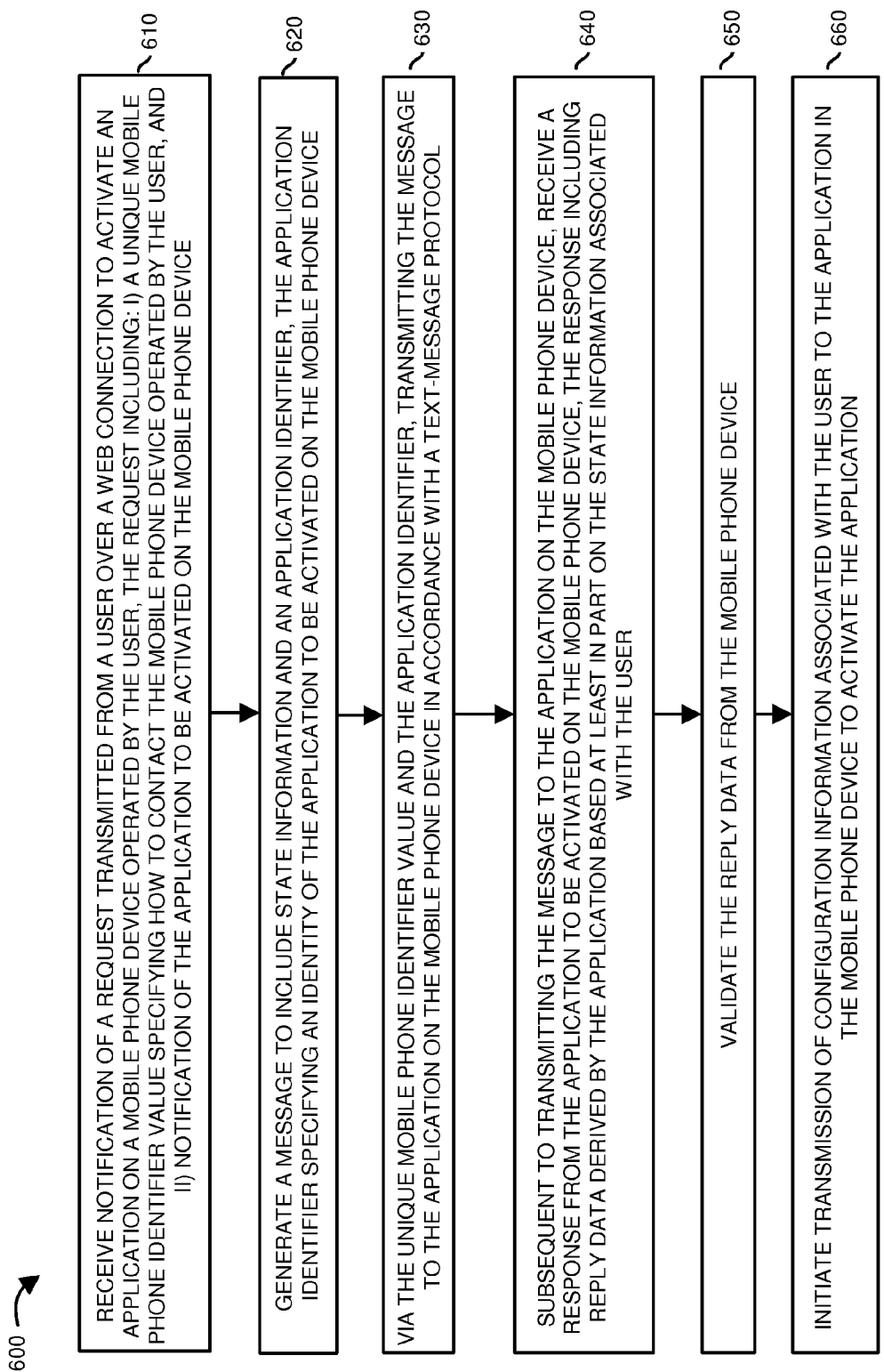

FIG. 6 is a flowchart 600 illustrating an example method implemented in an application server and/or related resources according to embodiments herein. Note that there will be some overlap with respect to concepts as discussed above.

In step 610, the server 110-2 receives notification of a request transmitted from a user 108 over a web connection to activate an application 160 on the mobile phone device 150 operated by the user 160. By way of a non-limiting example, the request can include: i) a unique mobile phone identifier value 210 specifying how to contact the mobile phone device 150 operated by the user, ii) notification of the application 160 to be activated on the mobile phone device 150, an identifier of the user making the request, configuration information needed to activate the application 160, etc.

In step 620, the server 110-2 generates a message 142 to include state information and an application identifier, the application identifier specifying an identity of the application 160 to be activated on the mobile phone device 150.

In step 630, via the unique mobile phone identifier value 210 and the application identifier, the server 110-2 transmits the message 142 to the application 160 on the mobile phone device 150 in accordance with a protocol such as a suitable text-message protocol typically used in cellular network communications.

In step 640, subsequent to transmitting the message 142 to the application 160 on the mobile phone device 160, the server 110-2 receives a response 144 from the application 160. In one embodiment, the response 144 includes reply data 146 derived by the application 160 and/or mobile phone device 150 based at least in part on the state information (e.g., information received in message 142) associated with the user 108.

In step 650, the server 110-2 validates the reply data 146 from the mobile phone device 150.

In step 660, the server 110-2 initiates transmission of configuration information associated with the user 108 to the application 160 in the mobile phone device 150 to activate the application 160.

Figure 7:
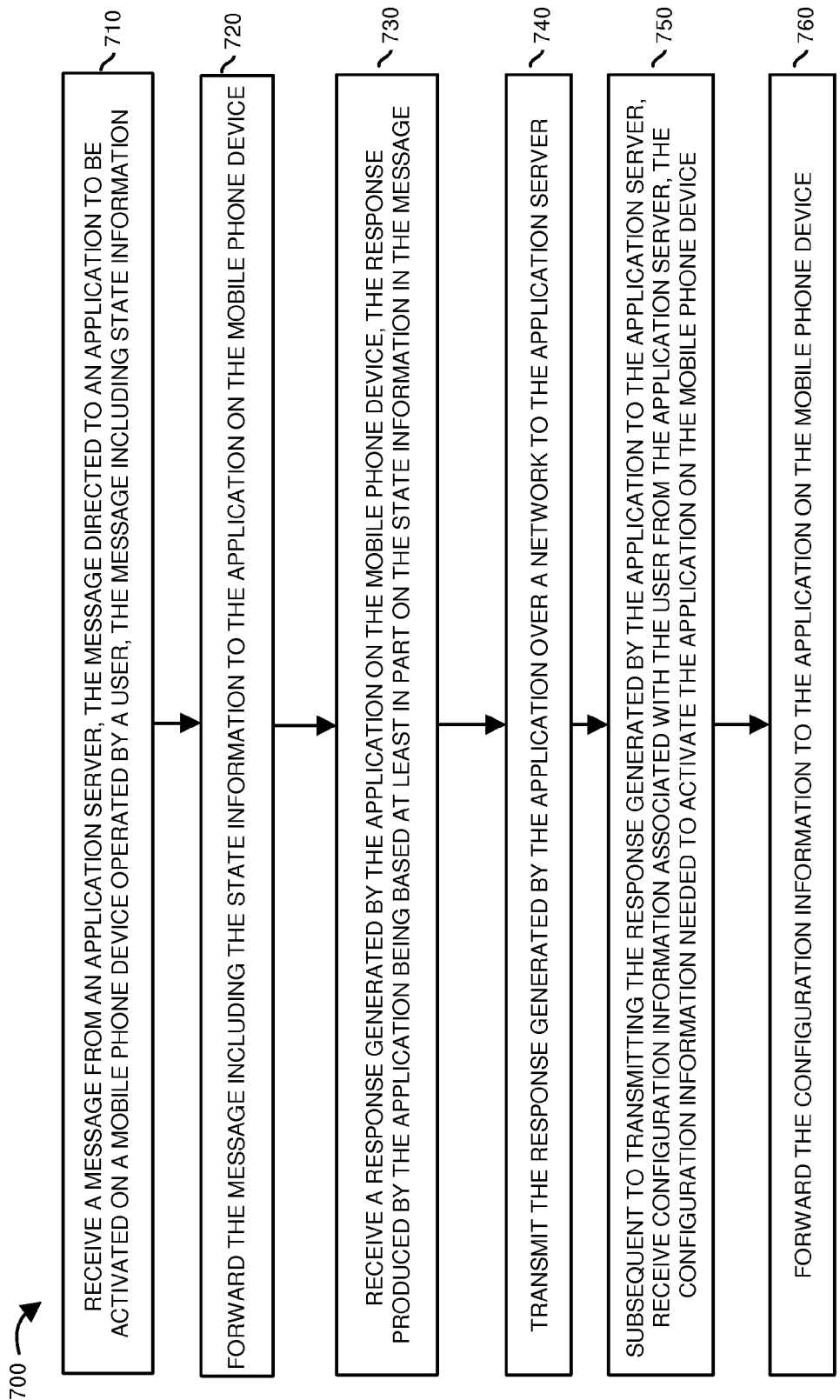

FIG. 7 is a flowchart 700 illustrating an example method implemented in a mobile phone device and/or related resources according to embodiments herein. Note that there will be some overlap with respect to concepts as discussed above.

In step 710, the mobile phone device 150 (and/or operating system 155) receives the message 142 from the server 110-2, the message 142 directed to the application 160. As previously discussed, the message 142 can include state information such as a web cookie or other suitable information.

In step 720, the mobile phone device 150 (and/or operating system 155) forwards the message 142 including the state information to the application 160 on the mobile phone device 150.

In step 730, the mobile phone device 150 (and/or operating system 155) receives a response 144 generated by the application 160 on the mobile phone device 150. The response 144 and/or corresponding reply data 146 produced by the application 160 can be generated based at least in part on the state information received in the message 142. In one embodiment, the response 144 is a request to retrieve configuration information; the request can include the state information received in the message 142.

In step 740, the mobile phone device 150 (and/or operating system 155) transmits the response 144 generated by the application 160 over a network 190-3 to the server 110-2.

In step 750, subsequent to transmitting the response 144 generated by the application 160 to the server 110-2, the mobile phone device 150 (and/or operating system 155) receives configuration information associated with the user 108 from the server 110-2.

In step 760, the mobile phone device 150 (and/or operating system 155) forwards the configuration information to the application 160 on the mobile phone device 150.

Figure 8:
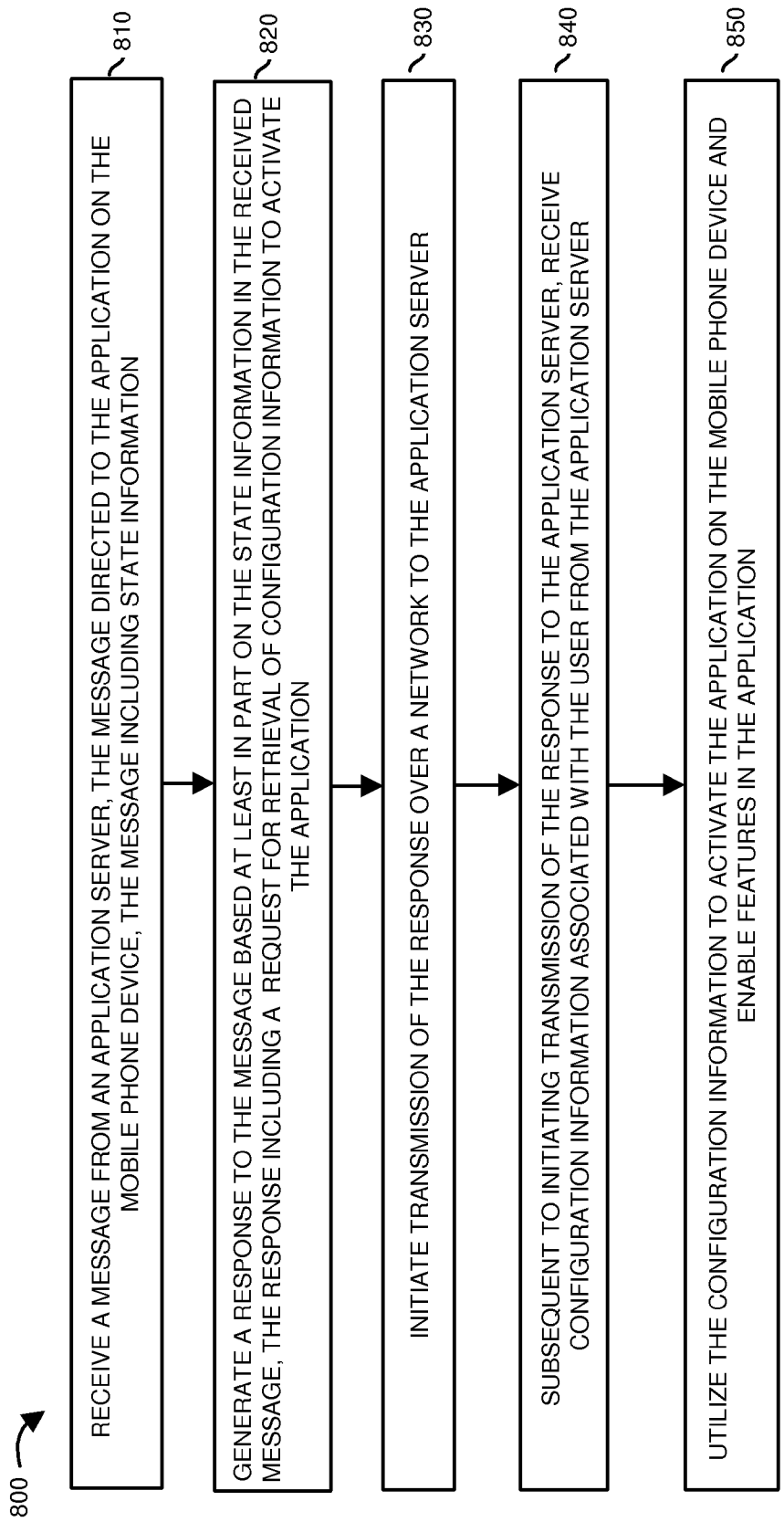

FIG. 8 is a flowchart 800 illustrating an example method implemented in a yet-to-be activated application and/or related resources according to embodiments herein. Note that there will be some overlap with respect to concepts as discussed above.

In step 810, the application 160 receives a message 142 transmitted from server 110-2, the message 142 being directed to the application 160 on the mobile phone device 150 and including state information In step 820, the application 160 generates a response 144 to the message 142 based at least in part on the state information in the received message 142. In one embodiment, the response 142 includes or is a request for retrieval of configuration information to activate the application 160.

In step 830, the application 160 initiates transmission of the response 144 over a network 190-3 to the server 110-2.

In step 840, subsequent to initiating transmission of the response 144 to the server 110-2, the application 160 receives configuration information associated with the user 108 from the server 110-2.

In step 850, the application 160 utilizes the configuration information to activate the application 160 on the mobile phone device 150 and enable features in the application 160.

Note again that techniques herein are well suited for activating one or more applications on a remotely located computer device (e.g., phone device, personal digital assistant, etc.). However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    subsequent to downloading of an application to a mobile phone device operated by a user, at an application server, receiving notification of a request transmitted over a web connection from the user operating an auxiliary computer device disparately located with respect to the mobile phone device, the request from the user at the auxiliary computer device indicating to activate the application on the mobile phone device, the request including: i) a unique mobile phone identifier value specifying how to contact the mobile phone device operated by the user, and ii) notification of the application to be activated on the mobile phone device;
    generating a message, the message including an application identifier specifying an identity of the application to be activated on the mobile phone device; and
    via the unique mobile phone identifier value and the application identifier, transmitting the message from the application server to the application on the mobile phone device;
    wherein the transmitted message includes state information provided by the application server;
    wherein the application applies a function to the state information to produce a unique value that is included in a response;
    the method further comprising:
    at the application server, receiving the response from the mobile phone device, the application server knowledgeable of the function that is used by the application to convert the state information into the unique value, the application server verifying that the unique value in the received message is correct;
    in response to detecting that the unique value in the received message is correct, mapping the unique value to configuration information; and
    forwarding the configuration information to the mobile phone device, the configuration information activating the application on the mobile phone device.

2. The method as in claim 1 further comprising:
    transmitting the message to the application on the mobile phone device in accordance with a mobile phone text message protocol.

3. The method as in claim 1 further comprising:
    receiving personal information associated with the user from a web server enabling the user to generate the request including the unique mobile phone identifier value and the notification; and
    utilizing the personal information to identify the state information associated with the user.

4. The method as in claim 3, wherein the state information is a web cookie and wherein the response includes the web cookie.

5. The method as in claim 3,
    wherein the response is an HTTP request generated by the application on the mobile phone device to retrieve the configuration information from the application server.

6. A method comprising:
    initiating distribution of a web page from a web server to a computer device operated by a user, the web page including a graphical user interface, the graphical user interface including a data field to enter a unique mobile phone identifier value associated with a mobile phone device and an identity of an application downloaded to the mobile phone device, the mobile phone device disparately located with respect to the computer device;
    from the user operating a browser displaying the web page on the computer device: i) receiving the unique mobile phone identifier value specifying the mobile phone device operated by the user, and ii) receiving a notification from the user, the notification indicating a particular application to be activated on the mobile phone device;
    at the web server, generating a request to activate the application on the mobile phone device, the request initiating communications between an application server and the mobile phone device to activate the application of the mobile phone device;
    transmitting the request to the application server;
    obtaining personal information associated with the user;
    forwarding the personal information to the application server;
    at the application server, receiving the request, the request including: i) the unique mobile phone identifier value specifying how to contact the mobile phone device operated by the user, and ii) notification of the application to be activated on the mobile phone device;
    at the application server, mapping the personal information to a corresponding state information;
    generating a message to include the state information and an application identifier, the application identifier specifying an identity of the application to be activated on the mobile phone device;
    via the unique mobile phone identifier value and the application identifier, transmitting the message from the application server to the application on the mobile phone device;
    subsequent to transmitting the message to the application on the mobile phone device, receiving a response from the application to be activated on the mobile phone device, the response including reply data, the application deriving the reply data based at least in part on the state information associated with the user
    at the application server, validating the reply data received from the mobile phone device;
    mapping the reply data to configuration information associated with the user;

from the application server, initiating transmission of the configuration information associated with the user to the application on the mobile phone device to activate the application; and at the mobile phone device, utilizing the configuration information to activate the application.

* * * * *